United States Patent
Murdoch (12)

(10) Patent No.: US 6,545,061 B1
(45) Date of Patent: Apr. 8, 2003

(54) RECYCLING OF POLYETHYLENE TEREPHTHALATE WITH REGENERATION OF ACETIC ACID

(75) Inventor: William Speight Murdoch, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/631,053

(22) Filed: Aug. 1, 2000

(51) Int. Cl.$^7$ ................................................ C08J 11/04
(52) U.S. Cl. ........................................ 521/48; 521/48.5
(58) Field of Search .......... 521/48, 48.5; 264/FOR 101

(56) References Cited

U.S. PATENT DOCUMENTS

| | | |
|---|---|---|
| 3,839,414 A | 10/1974 | Windle |
| 5,554,657 A | 9/1996 | Brownscomb |

FOREIGN PATENT DOCUMENTS

| | | | |
|---|---|---|---|
| DE | 195 34 276 | 3/1997 | |
| DE | 199 14 083 A1 * | 9/2000 | ........... C08L/67/02 |
| JP | 53063338 | 6/1978 | |

OTHER PUBLICATIONS

Kirk–Othmer, Encyclopedia of Chemical Technology, "Acetic Acid and Derivatives; Methyl Acetate Carbonylation", 1991, pp. 146–150, vol. 1, John Wiley and Sons, U.S.

Kirk–Othmer, Encyclopedia of Chemical Technology, "Cellulose Esters; Manufacturing and Processing", 1993, pp. 503–512, vol. 5, John Wiley and Sons, U.S.

\* cited by examiner

*Primary Examiner*—Edward J. Cain
*Assistant Examiner*—Katarzyna W. Lee
(74) *Attorney, Agent, or Firm*—Susan F. Johnston

(57) ABSTRACT

Disclosed herein is a process for depolymerizing and purifying recyclable PET comprising the steps of:

(a) conducting acetolysis on recyclable PET to form terephthalic acid and ethylene glycol diacetate;

(b) reacting the terephthalic acid with methanol to form dimethyl terephthalate; and (c) reacting the dimethyl terephthalate with the ethylene glycol diacetate under transesterification and polycondensation conditions to form both a PET product with an unusually low concentration of copolymerized diethylene glycol and methyl acetate.

Further disclosed is a process wherein the above process is efficiently combined with a process for producing cellulose acetate. In addition to steps (a)–(c), the combination process additionally comprises the steps of:

(d) carbonylating the methyl acetate with carbon monoxide to form acetic anhydride; and (e) acetylating cellulose with the acetic anhydride to form cellulose acetate and acetic acid, with the acetic acid being useful in step (a).

18 Claims, 3 Drawing Sheets

RECYCLING OF POLYETHYLENE TEREPHTHALATE WITH REGENERATION OF ACETIC ACID

FIELD OF THE INVENTION

The present invention relates to the field of depolymerization and purification of contaminated polyethylene terephthalate. The present invention also relates to the fields of dimethyl terephthalate production, polyethylene terephthalate production, acetic anhydride production, and cellulose ester production.

BACKGROUND OF THE INVENTION

It is increasingly important to provide economically feasible processes for recycling waste. One such waste is contaminated, but otherwise recyclable, polyethylene terephthalate (PET). This includes PET that is contaminated with a material present on the polymer surface or diffused into the polymer, PET that is copolymerized with modifying agents, and PET that is formed into an article containing layers or coatings of other materials. Much recyclable PET is contaminated to the extent that it must be depolymerized and purified prior to being recycled for use as food packaging. Common contaminants include colorants and dyes, opacifiers, polymerization catalyst metals, polymer modifiers, barrier resins, and oxygen absorbers. The predominant source of recyclable PET is discarded PET soft drink bottles. Scrap PET fiber, scrap PET film, and poor quality PET polymer are also major sources of recyclable PET.

PET has been depolymerized through various chemical reactions including hydrolysis, methanolysis, ammoniolysis, and acetolysis. Acetolysis can be accomplished with either acetic acid itself or with metal salts of acetic acid. For example, JP 53063338 teaches heating PET with acetic acid and an ester-interchange catalyst to form terephthalic acid (TPA) and ethylene glycol diacetate. DE 19534276 discloses a process of digesting scrap PET in a metal acetate melt to form a metal terephthalate ester and ethylene glycol diacetate. Additionally, DE 19534276 teaches recovering the solid terephthalate salt and reacting it with acetic acid to form terephthalic acid and a metal acetate. The metal acetate is recovered for reuse in the metal acetate melt step. However, DE 19534276 further teaches that the ethylene glycol diacetate by-product is not useful in the PET recycling process and should be collected for use as a formulation material in pharmaceutical or cosmetics manufacture, thus producing a wasteful by product.

Another problem commonly encountered in PET recycling is that the conditions required to manufacture PET often produce deleteriously high concentrations of diethylene glycol (DEG) in the polymer chain. DEG copolymerization deleteriously lowers the melting point and strength of PET polymer, that is, both the polymer melting point and strength decrease with increasing DEG copolymerization.

Yet another problem prevalent in the PET recycling field is the lack of sufficient economic incentive for companies to recycle PET or use recycled PET. It would be desirable to provide a PET recycling process that could be easily and efficiently combined with another manufacturing process by utilizing byproducts produced when recycling PET. Such a combination would reduce the cost of recycling PET, increase the amount of PET recycled, and thus produce a positive impact on the environment by reducing the amount of otherwise recyclable PET that is incinerated or landfilled.

In light of the above, it would be desirable to provide a process for depolymerizing and purifying recyclable PET that would produce a recycled PET product with a low concentration of copolymerized DEG. It would be further desirable for such a process to be combined with other chemical processes in such a manner that substantially no waste process byproducts are produced.

SUMMARY OF THE INVENTION

The present invention includes a process for depolymerizing and purifying recyclable PET including a step of conducting acetolysis on recyclable PET to produce TPA and ethylene glycol diacetate, a step of converting the TPA to dimethyl terephthalate (DMT), and a step of contacting the ethylene glycol diacetate and DMT under transesterification and polycondensation conditions to form a PET product. The present invention furthermore includes a combination process that further comprises a step of carbonylating the methyl acetate co-product from the PET production step to form acetic anhydride, a still further step of reacting the acetic anhydride with cellulose to form cellulose acetate and an acetic acid by-product, and an even still further step of routing this acetic acid by-product of cellulose acetate production back to the PET acetolysis depolymerization step as a reactant.

DETAILED DESCRIPTION

Figure 1:
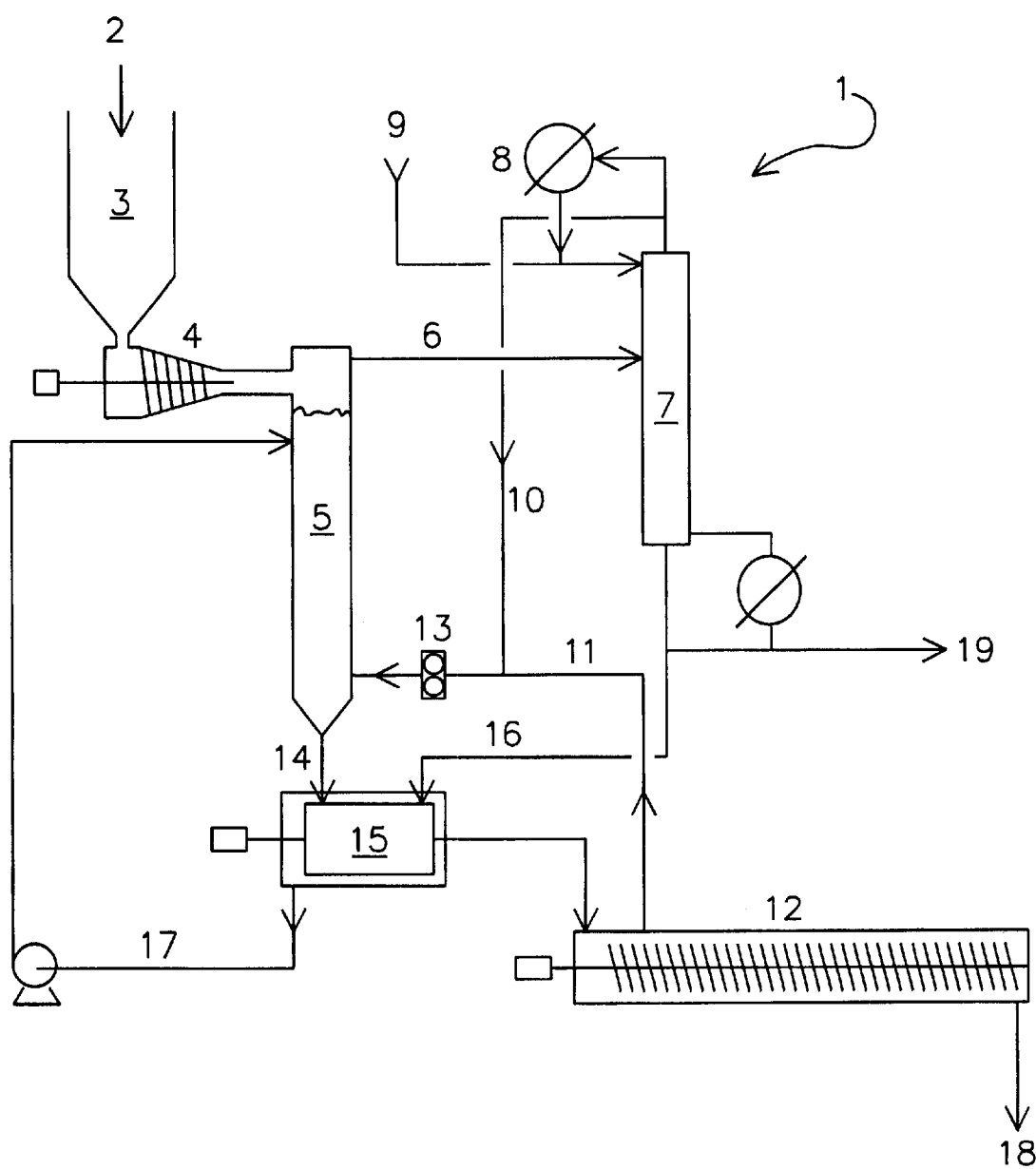
FIG. 1 shows the solution acetolysis step of the depolymerization and purification process of the present invention wherein recyclable PET and acetic acid are fed into the process as starting materials producing TPA and ethylene glycol diacetate.

It has been discovered that PET having an unusually low concentration of copolymerized DEG may be formed by reacting ethylene glycol diacetate with DMT under transesterification and polycondensation conditions. Further, it has been discovered that a PET depolymerization and purification process making particularly efficient use of this particular PET polymerization step includes PET depolymerization via acetolysis reaction forming ethylene glycol diacetate and TPA. The ethylene glycol diacetate thus formed is thereafter used in the PET polymerization.

The PET depolymerization, purification, and polymerization process of the present invention includes the steps of conducting acetolysis on recyclable PET to form TPA and ethylene glycol diacetate, reacting the TPA thus formed with methanol to form DMT, then polymerizing the DMT with the ethylene glycol diacetate under transesterification and polycondensation conditions to form PET. For purposes of the present invention, the term "acetolysis" describes both direct treatment of the recyclable PET with acetic acid under solution conditions and a two-step method of digesting the recyclable PET in an acetate melt, preferably a metal acetate melt, to form a terephthalate metal ester, followed by reacting the terephthalate ester in acetic acid solution to form TPA. Suitable acetates for conducting the acetolysis by way of the melt method include sodium acetate, potassium acetate, ammonium acetate, and combinations thereof.

In the acetolysis step of the present process, recyclable PET is contacted with an amount of acetic acid or acetate melt suitable to dissolve the recyclable PET into monomeric units of ethylene glycol diacetate and TPA or a terephthalate salt. The amount of acetic acid or metal acetate used is preferably such that the ratio of acid equivalents from acetic acid or metal acetate to base equivalents contained in the recyclable PET is preferably between from about 1:1 to about 10:1, more preferably from about 2:1 to about 5:1. It is preferred that a stoichiometric excess of acetic acid equivalents be used to promote a reasonable reaction rate. In the DMT forming and purification step of the present process, the ratio of base equivalents from methanol to acid equivalents from TPA is preferably from about 1:1 to about 20:1, with a ratio from about 1:1 to about 5:1 being more preferable. In the PET forming step of the present process, the ratio of base equivalents from ethylene glycol diacetate to acid equivalents from the DMT is preferably from about 1:1 to about 10:1, with a ratio from about 1.5:1 to about 3:1 being more preferable.

When conducting the present process using solution acetolysis, it is preferable to conduct the acetolysis step at a temperature of about 200 to about 350° C. and a pressure of about 0 to about 5 bars (gauge), with a temperature of about 225 to about 275° C. and an pressure of about 0 to about 2 bars (gauge) being more preferable.

When conducting the present process using acetate melt acetolysis, it is preferable to conduct the melt phase at a temperature of about 100 to about 350° C., depending upon the metal acetate used, and a pressure from about atmospheric pressure to about 2 bars. The aqueous acetic acid phase of the two-step acetate melt acetolysis should be conducted under conditions similar to the aqueous direct acetolysis above.

PET depolymerization by the solution acetolysis process may be performed in a batch, semi-continuous or continuous process with a continuous solution acetolysis process being preferred. That is, recyclable PET and a stream of acetic acid are continuously fed into the reaction system and a stream of TPA product and methyl acetate co-product are continuously withdrawn. A continuous stream may be provided by intermittent or constant addition and withdrawal of material.

An opportunity to increase efficiency in the solution acetolysis process lies in capturing the unreacted excess acetic acid vapor as it collects at the top of the acetolysis reactor, separating it from the ethylene glycol diacetate vapor and reintroducing it into the acetolysis reactor as part of the acetic acid feed stream to the reactor. This avoids the condensation and re-evaporation of the acetic acid which would be necessary if liquid acetic acid were fed to the reactor and results in significant energy savings.

The DMT forming step of the present process wherein TPA is reacted with methanol is preferably conducted at a temperature of about 250 to about 330° C. and a pressure of about 2 bars (gauge) to about 20 bars (gauge), with a temperature of about 260 to about 310° C. and a pressure of about 3 to about 7 bars being more preferable. Useful DMT forming and purification process conditions are described in U.S. Pat. No. 3,839,414, incorporated herein in its entirety.

The transesterification stage of the PET forming step of the present process is preferably first conducted at a temperature of about 200 to about 270° C. and a pressure of about 0 to about 5 bars (gauge), with a temperature of about 215 to about 240° C. and a pressure of about 0.3 to about 3 bars (gauge) being more preferable. During the course of the reaction the temperature is allowed to rise and the pressure to fall. When conducted in a continuous manner, the transesterification reaction is preferably performed in from two to six vessels in series with four vessels being more preferred. The polycondensation stage of the PET-forming step is preferably conducted at a temperature of about 250 to about 350° C. and a pressure from about 1 bar (gauge) to about 0.1 mbar (absolute), with a temperature of about 235 to about 285° C. and a pressure of about 0 bar (gauge) to about 0.5 mbar (absolute) being more preferable. During the course of the reaction the temperature is allowed to rise and the pressure to fall. When conducted in a continuous manner, the polycondensation reaction is performed in from one to three vessels in series with two vessels being preferred.

During manufacture of the PET it is advantageous to use one or more catalysts to speed the rate of reaction. Catalysts commonly used in PET manufacture from DMT and ethylene glycol are effective in promoting the reactions of this process.

An important aspect of the present invention is the use of the ethylene glycol diacetate byproduct of acetolysis to form PET. Accordingly, the present invention includes a process for preparing PET by reacting ethylene glycol diacetate with DMT under transesterification and polycondensation conditions. Advantageously and unexpectedly, the inventor has found that the use of ethylene glycol diacetate to provide the diol component of the recycled PET product provides a much lower DEG-content PET polymer.

Although not to be bound by any theory, it is believed that the copolymerized DEG concentration in the PET product produced by the process of the present invention is lower than that obtained when PET is traditionally produced from TPA and ethylene glycol or from DMT and ethylene glycol because the concentration of hydroxyethyl ends present during PET synthesis is extremely low and because the reaction between DMT and ethylene glycol diacetate is conducted in a neutral environment. Advantageously, both the PET oligomer formed from DMT and ethylene glycol diacetate and the ethylene glycol diacetate itself are terminated with acetate end groups rather than the hydroxyl end groups present when PET is made from ethylene glycol and either DMT or TPA. It is believed that hydroxyl end groups are a part of the mechanism for the production of DEG. Additionally, during the reaction of ethylene glycol with TPA, the reaction mixture is acidic, such acidity being catalytically favorable to the production of an ether from two hydroxyl groups. Because during the reaction between DMT and ethylene glycol diacetate the mixture is not acidic, little or no DEG is produced. Accordingly, the process of the present invention provides a recycled PET product having a desirably low concentration of DEG units of less than about 1.5 weight percent of the total polymer weight. Preferably, the DEG unit concentration is less than about 0.5 weight percent of the total polymer weight.

Referring to the figures to more particularly describe the present invention, FIG. 1 schematically illustrates a preferred embodiment of the acetolysis step 1 of the present PET depolymerization and purification process. Recyclable PET flakes are fed through a PET feed line 2 and charged to a hopper 3 and fed with a choking screw, rotary airlock, or similar feeding device 4 into an acetolysis reactor 5. The feed device 4 prevents the acetic acid vapors from leaving the reactor through the hopper. The ethylene glycol diacetate formed in the acetolysis reaction acts as a solvent in the reactor. The vapor top product is directed from the reactor along process line 6 to the distillation column 7 where it is distilled into ethylene glycol diacetate and acetic acid. The excess acetic acid is removed from the top of the distillation column as both a vapor stream through process line 10 located before the condenser 8 and as a liquid reflux stream returned from the condenser 8 to the distillation column 7. Fresh liquid acetic acid is most efficiently fed to the acetolysis process along line 9 so that it serves as reflux liquid to column 7 prior to being routed to the reactor for use as a reactant. A first stream of acetic acid vapor from the column 7 is directed through line 10 and combined with a second stream of acetic acid vapor from the dryer 12 through line 11 to provide an acetic acid feed to the acetolysis reactor 5. This acetic acid vapor stream is forced into the reactor 5 by a blower 13, or other mechanical means.

FIG. 1 further illustrates line 14 for transferring the TPA from the bottom of the acetolysis reactor 5 as a slurry in ethylene glycol diacetate and some acetic acid to a washing centrifuge 15. The TPA crystals are there washed of any remaining acetic acid with the ethylene glycol diacetate liquid provided from the distillation column 7 along line 16. Slurry washings from the centrifuge 15 are returned to the acetolysis reactor 5 via a pump along line 17. Wet TPA from the centrifuge 15 is dried of any remaining liquid in the dryer 12 before leaving the process as a stream along line 18. A stream of ethylene glycol diacetate leaves the distillation column 7 along line 19 as a process co-product.

Figure 3:
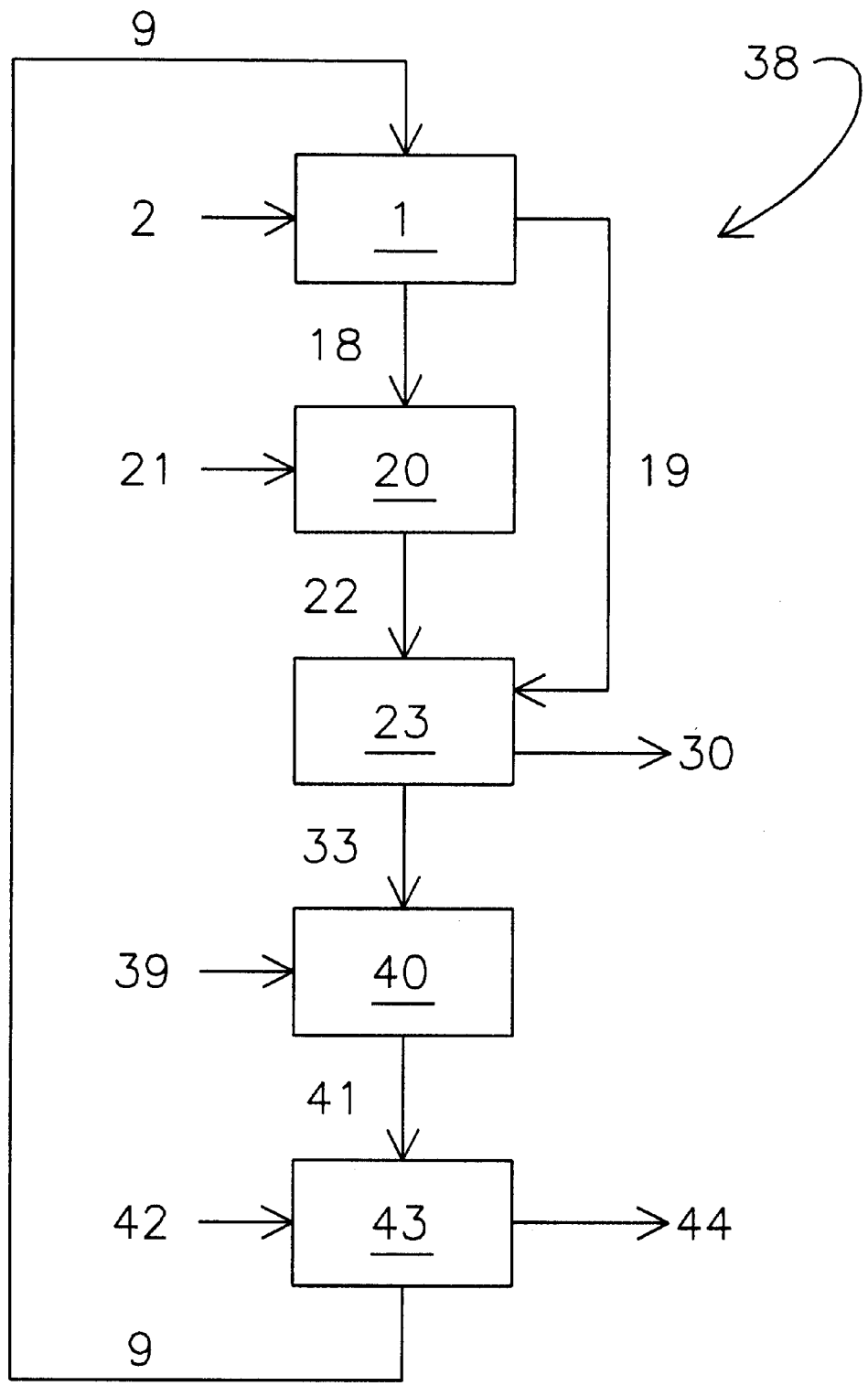
FIG. 3 shows a flow chart representing the combination process of the present invention wherein the present PET depolymerization, purification, and polymerization process is symbiotically integrated with cellulose acetate production.

The next step in the preferred PET depolymerization and purification process is a step of converting TPA into DMT. Referring to FIG. 3, the stream of dried TPA provided along line 18 is contacted with methanol via a methanol feed line 21 to form DMT. The DMT is preferably produced according to a reaction and distillation process similar to that described in U.S. Pat. No. 3,839,414, incorporated herein in it's entirety. The DMT is thus formed is removed from the DMT reactor along line 22.

Figure 2:
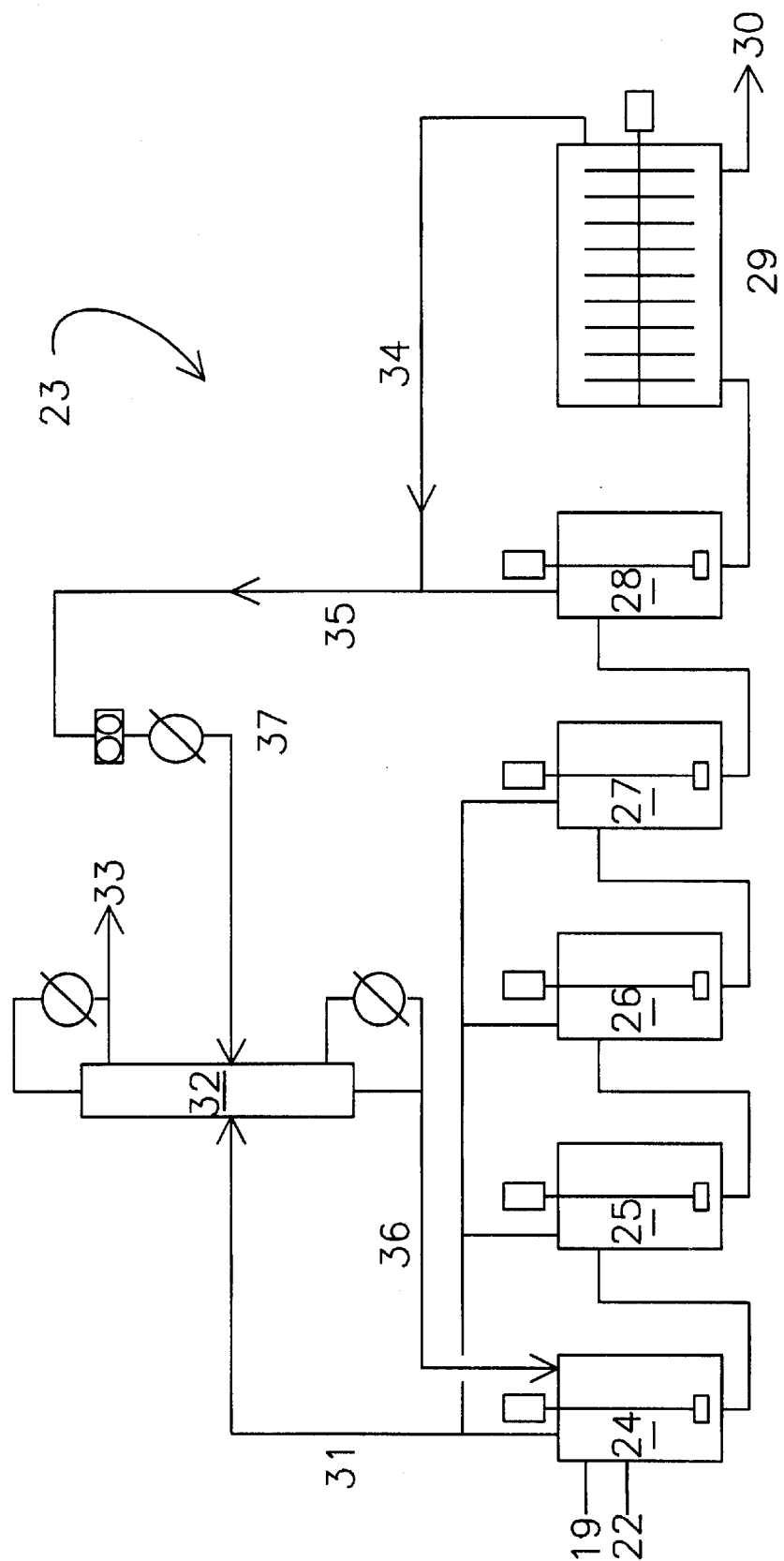
FIG. 2 shows the transesterification and polycondensation step of the depolymerization and purification process of the present invention wherein a recycled PET product and a methyl acetate byproduct are produced from DMT and ethylene glycol diacetate.

Referring to FIGS. 2 and 3, a preferred embodiment of forming PET from the DMT and the ethylene glycol diacetate is shown as step 23. Purified DMT and ethylene glycol diacetate are continuously fed through lines 22 and 19, respectively, into transesterification equipment similar to that commonly used to produce PET from DMT and ethylene glycol. The DMT reacts with the ethylene glycol diacetate to produce methyl acetate vapor and liquid polyester oligomers in transesterification reactors 24, 25, 26, and 27. The molecular weight of the oligomeric material thus formed is thereafter increased under polycondensation conditions in polymerization reactors 28 and 29, to produce the low DEG-content recycled PET product and small amounts of ethylene glycol diacetate vapors. The PET product is removed from the process along line 30.

FIG. 2 shows that vapors from the transesterification reactors, 24, 25, 26, and 27 are collected and fed along line 31 to a distillation column 32 where the methyl acetate co-product is separated from the unreacted ethylene glycol diacetate. The liquid methyl acetate is removed from the distillation column along line 33.

Ethylene glycol diacetate is gathered from all process vessels via lines 31, 34, and 35 and routed through the distillation column then back into the first transesterification reactor via line 36. A vacuum pumping system 37 in line 35 increases the pressure of the vapors and condenses most of the ethylene glycol diacetate before it reaches the distillation column.

The recyclable PET used in the present invention is selected from PET homopolymer and PET copolymer. The recyclable PET preferably contains repeat units having a dicarboxylic acid component from preferably at least about 50 mole percent and more preferably at least about 75 mole percent terephthalic acid and a diol component from preferably at least about 50 mole percent ethylene glycol, more preferably at least about 75 mole percent ethylene glycol, based upon 100 mole percent dicarboxylic acid and 100 mole percent diol present in the recyclable PET.

In the recyclable PET copolymer, the dicarboxylic acid component of the PET may optionally be modified with up to about 50 mole percent, and preferably up to about 25 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like.

In addition, the glycol component of the recyclable PET copolymer may optionally be modified with up to about 50 mole percent and preferably up to about 25 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2-ethylhexanediol-(1,3); 2,2-dimethylpropane-diol-(1,3); hexanediol-(1,3); 1,4-di-(hydroxyethoxy)-benzene; 2,2-bis-(4-hydroxyphenyl)-propane; 2,4-dihydroxy-1,1,3,3-tetramethylcyclobutane; 2,2-bis-(3-hydroxyethoxyphenyl)-propane; and 2,2-bis-(4-hydroxypropoxyphenyl)-propane. The 1,4-cyclohexanedimethanol may be in the cis or the trans form or as cis/trans mixtures.

The recyclable PET resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The recyclable PET may additionally be blended with up to 50 mole percent, preferably up to 25 mole percent of another polyester selected from other polyesters, and any other polymer containing units that do not interfere with the intended reactions of the present process.

Combination Process

The present invention preferably further includes a combination wherein the PET acetolysis depolymerization, purification, and re-polymerization process disclosed above is efficiently combined with a process for manufacturing acetic anhydride from methyl acetate and a process for manufacturing cellulose acetate from cellulose and acetic anhydride. This particular combination of processes regenerates the acetic acid required in the PET depolymerization process while at the same time producing cellulose acetate and purified PET products. In the combination process of the present invention the PET acetolysis, depolymerization, and purification is modified by the additional steps of carbonylating the methyl acetate produced during the PET manufacture to form acetic anhydride, and then reacting with the acetic anhydride with cellulose to form cellulose acetate. The combination process of the present invention preferably includes the use of the acetic acid by-product of the acetylation step as the acetic acid reactant needed in the acetolysis depolymerization of recyclable PET. This preferred combination process is especially advantageous in that no environmentally undesired byproducts are produced.

In the combination process of the present invention, the particular combination of PET depolymerization and purification by way of acetolysis, the use of the ethylene glycol diacetate co-product of that acetolysis reaction to form a PET product and a methyl acetate co-product, the carbonylation of the methyl acetate co-product to form acetic anhydride for use in cellulose acetate manufacture, and the use of the acetic acid co-product of the cellulose acetate manufacture as a starting material in the acetolysis step result in a cost efficient process of forming a PET product and a cellulose acetate product with no major by-products being formed. The combination process consumes recyclable PET, methanol, carbon monoxide, and cellulose to produce recycled PET product and cellulose acetate without producing a major waste stream. Additionally, the recycled PET product so produced is remarkably low in DEG content, thus possessing superior physical properties.

In the preferred combination process of the present invention, the methyl acetate by-product from the PET-forming transesterification step of the depolymerization and purification process described above is carbonylated with carbon monoxide to make acetic anhydride. Acetic anhydride formation via methyl acetate carbonylation is well known in the art and described in R. E. Kirk, *Encyclopedia of Chemical Technology*, Fourth Edition, 1991, Vol. 1, p. 146–150, incorporated herein. Typical methyl acetate carbonylation is conducted by reacting a ratio of carbon monoxide equivalents to methyl acetate equivalents between about 1 to 5, preferably about 1 to 1.5, typically in the presence of a rhodium catalyst. The carbonylation is preferably conducted under process conditions of about 120 to about 200° C., more preferably about 125 to about 150° C., and a pressure of about 3 to about 8 bars (gauge).

After the carbonylation step, the combination process of the present invention includes a step of reacting the acetic anhydride with cellulose in an acetylation reaction to form cellulose acetate. Processes for making cellulose acetate from acetic anhydride and cellulose are well known in the art and generally described in R. E. Kirk, *Encyclopedia of Chemical Technology*, Fourth Edition, 1993, vol. 5, p. 503–512, incorporated herein. Typical cellulose acetylation is conducted as a solution process employing sulfuric acid as the catalyst with acetic anhydride in an acetic acid solvent. The acetic anhydride and cellulose are preferably reacted together at a ratio of cellulose equivalents to acetic anhydride equivalents between about 1:1 to about 4:1, with a ratio between about 1:1 to about 3:1 being more preferable. The typical acetylation solution conditions are preferably controlled to a temperature range between about 40 and about 50° C. The cellulose triacetate formed is then hydrolyzed in solution for varying lengths of time (from about 4 to about 20 hours) until the desired lower degree of acetyl substitution is attained.

The cellulose acetate product is recovered following the hydrolysis reaction, preferably by precipitation from solution, leaving an aqueous acetic acid by-product. In the most preferred embodiment of the present invention, this aqueous acetic acid by-product of the cellulose acetate manufacture is recovered from the precipitation step, concentrated, and routed to the acetolysis reactor of the PET depolymerization phase of the present combination process for use as a starting material in the acetolysis depolymerization of recyclable PET.

Any known source of cellulose may be used in the combination process of the present invention. Examples include hardwood pulp, softwood pulp, cotton linter, bacterial cellulose, and regenerated cellulose.

Referring again to FIG. 3, the combination process 38 is preferably a substantially-closed loop process wherein recyclable PET and acetic acid continuously feed the acetolysis step 1 via lines 2 and 9, respectively. The TPA formed in the acetolysis step and fresh methanol continuously feed the DMT formation step 20 via lines 18 and 21. The DMT thus formed and the ethylene glycol diacetate formed during acetolysis feed the transesterification and polycondensation step 23 via feed lines 22 and 19, respectively. A PET product leaves the process along line 30. The methyl acetate co-product formed during step 23 is fed via line 33, along with a fresh carbon monoxide feed 39 to the carbonylation step 40. The acetic anhydride thus formed is fed along line 41, along with a fresh cellulose feed 42, to a cellulose acetate production step 43. A cellulose acetate product leaves the process along line 44. The acetic acid co-product formed during step 43 is then routed to acetic acid feed line 9 for re-entry into the acetolysis step 1.

In the drawings and specification, there have been disclosed typical preferred embodiments of the invention and, although specific terms are employed, they are used in a generic and descriptive sense only, and not for purposes of limitation. The scope of the invention is set forth in the following claims.

I claim:

1. A polyethylene terephthalate depolymerization and purification process comprising:
    (a) conducting acetolysis on recyclable polyethylene terephthalate to form terephthalic acid and ethylene glycol diacetate;
    (b) reacting said terephthalic acid with methanol to form dimethyl terephthalate; and
    (c) reacting said dimethyl terephthalate with said ethylene glycol diacetate under transesterification and polycondensation conditions to form a polyethylene terephthalate product, said polyethylene terephthalate product having units of diethylene glycol at a concentration of less than about 1.5 weight percent, based on the total weight of said polyethylene terephthalate product.

2. The process of claim 1 wherein said acetolysis step (a) is conducted by contacting said recyclable polyethylene terephthalate with an amount of acetic acid sufficient to dissolve said recyclable polyethylene terephthalate to form said ethylene glycol diacetate and said terephthalic acid.

3. The process of claim 1 wherein said acetolysis step (a) is conducted by digesting said recyclable polyethylene terephthalate in a melt of an acetate of a metal to form said ethylene glycol diacetate and a terephthalate ester of the metal, and contacting said terephthalate ester of the metal with an amount of acetic acid sufficient to form said terephthalic acid;

4. The process of claim 3 wherein said acetate is selected from the group consisting of sodium acetate, potassium acetate, ammonium acetate, and mixtures thereof.

5. The process of claim 1 wherein, the ratio of base equivalents from said methanol to acid equivalents from said terephthalic acid is from about 1:1 to about 20:1 in said step (b), and the ratio of base equivalents from said ethylene glycol diacetate to acid equivalents from said dimethyl terephthalate is from about 1:1 to about 10:1 in said step (c).

6. The process of claim 2 wherein said acetolysis step (a) is conducted at a temperature of about 200 to about 350° C. and a pressure of about 0 to about 5 bars (gauge), said step (b) is conducted at a temperature of about 250 to about 330° C. and a pressure of about 2 to 20 bars (gauge), and said step (c) is conducted at a temperature of about 200 to about 350° C. and a pressure of about 0.5 millibar (absolute) to 2 bars (gauge).

7. The process of claim 3 wherein said acetolysis step (a) is conducted at a temperature of about 100 to about 350° C. and a pressure of about atmospheric pressure to about 2 bars, said step (b) is conducted at a temperature of about 250 to about 330° C. and a pressure of about 2 to about 20 bars (gauge), and said step (c) is conducted at a temperature of about 200 to about 350° C. and a pressure of about 0.5 millibar (absolute) to 2 bars (gauge).

8. In a process for depolymerizing and purifying recyclable polyethylene terephthalate including a step of conducting acetolysis on said recyclable polyethylene terephthalate to produce terephthalic acid and ethylene glycol diacetate, the improvement which comprises:

(a) reacting said terephthalic acid with methanol to form dimethyl terephthalate; and (b) reacting said dimethyl terephthalate with said ethylene glycol diacetate under transesterification and polycondensation conditions to form a polyethylene terephthalate product.

9. The process of claim 8 wherein said step (a) is conducted at a temperature of about 250 to about 330° C. and a pressure of about 2 to about 20 bars (gauge), and said step (b) is conducted at a temperature of about 200 to about 350° C. and a pressure of about 0.5 millibar (absolute) to about 2 bars (gauge).

10. The process of claim 8 wherein the ratio of base equivalents from said methanol to acid equivalents from said terephthalic acid is from about 1:1 to about 20:1, and the ratio of base equivalents from said ethylene glycol diacetate to acid equivalents from said dimethyl terephthalate is from about 1:1 to about 10:1.

11. The process of claim 8 wherein said polyethylene terephthalate product has units of diethylene glycol at a concentration of less than about 1.5 weight percent, based on the total weight of said polyethylene terephthalate product.

12. A process comprising:

(a) conducting acetolysis on recyclable polyethylene terephthalate to form terephthalic acid and ethylene glycol diacetate;

(b) reacting said terephthalic acid with methanol to form dimethyl terephthalate;

(c) reacting said dimethyl terephthalate with said ethylene glycol diacetate under transesterification and polycondensation conditions to form a polyethylene terephthalate product and methyl acetate;

(d) carbonylating said methyl acetate with carbon monoxide to form acetic anhydride; and (e) acetylating cellulose with said acetic anhydride to form cellulose acetate and acetic acid.

13. The process of claim 12 further comprising recovering said acetic acid formed in said acetylation step (e) and reacting said acetic acid with said recyclable polyethylene terephthalate in said acetolysis step (a).

14. The process of claim 12 wherein said polyethylene terephthalate product includes units of diethylene glycol at a concentration of less than about 1.5 weight percent based on the total weight of said polyethylene terephthalate product.

15. The process of claim 12 wherein the ratio of base equivalents from said methanol to acid equivalents from said terephthalic acid is from about 1:1 to about 20:1 in said step (b), and the ratio of base equivalents from said ethylene glycol diacetate to acid equivalents from said dimethyl terephthalate is from about 1:1 to about 10:1 in said step (c).

16. The process of claim 12 wherein said acetolysis step (a) is conducted at a temperature of about 100 to about 350° C. and pressure of about 0 to about 5 bars (gauge), said step (b) is conducted at a temperature of about 250 to about 330° C. and a pressure of about 2 to 20 bars (gauge), and said step (c) is conducted at a temperature of about 200 to about 350° C. and a pressure of about 0.5 millibar (absolute) to 2 bars (gauge).

17. The process of claim 12 wherein said acetolysis step (a) is conducted by digesting said recyclable polyethylene terephthalate in a melt of an acetate of a metal to form said ethylene glycol diacetate and a terephthalate ester, and contacting said terephthalate ester of the metal with an amount of acetic acid sufficient to form said terephthalic acid.

18. The process of claim 17 wherein said acetate is selected from the group consisting of sodium acetate, potassium acetate, ammonium acetate and mixtures thereof.

\* \* \* \* \*